CARRIER POWERED PAGING SYSTEM
Filed Jan. 11, 1960 4 Sheets-Sheet 1
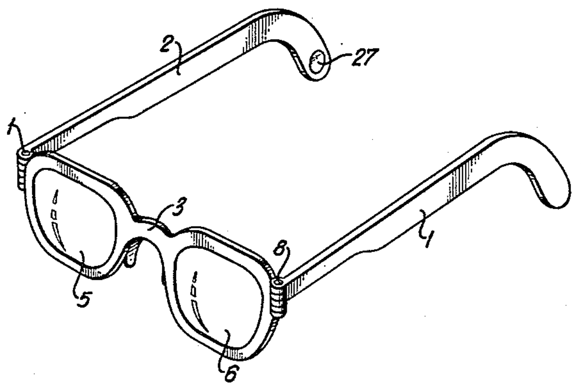
FIG. 1
FIG. 2
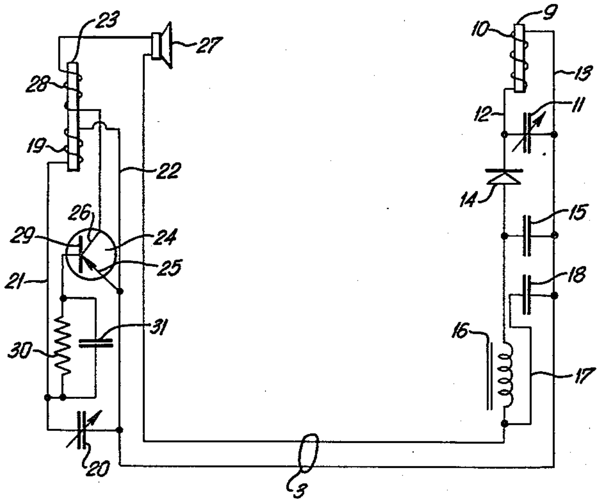
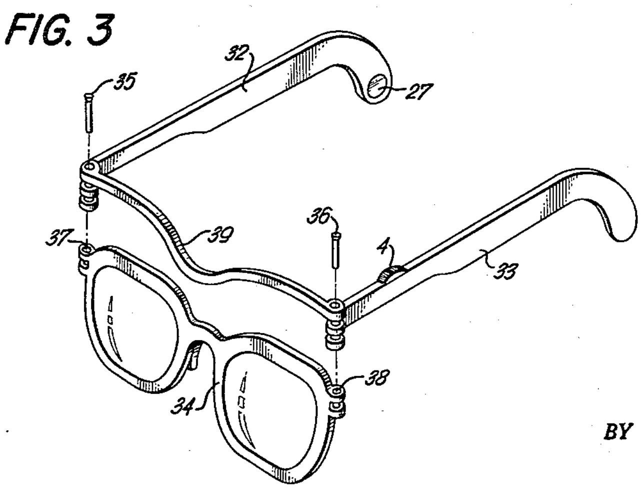
INVENTOR.
GILBERT C. NEE
BY R. E. Geangue
ATTORNEY.

Jan. 14, 1964 G. C. NEE 3,118,145

CARRIER POWERED PAGING SYSTEM

Filed Jan. 11, 1960 4 Sheets-Sheet 2

INVENTOR.
GILBERT C. NEE

BY R. E. Geaugue

ATTORNEY.

Jan. 14, 1964 G. C. NEE 3,118,145

CARRIER POWERED PAGING SYSTEM

Filed Jan. 11, 1960 4 Sheets-Sheet 3

INVENTOR.
GILBERT C. NEE

R. E. Geauque
ATTORNEY.

Jan. 14, 1964 G. C. NEE 3,118,145

CARRIER POWERED PAGING SYSTEM

Filed Jan. 11, 1960 4 Sheets-Sheet 4

INVENTOR.
GILBERT C. NEE

BY

ATTORNEY.

3,118,145
CARRIER POWERED PAGING SYSTEM
Gilbert C. Nee, 2366 Casitas Ave., Altadena, Calif.
Filed Jan. 11, 1960, Ser. No. 1,491
6 Claims. (Cl. 343—225)

This invention relates to a paging system and the like and has for its primary object to provide a novel paging system employing a receiver which derives its operating power from a radiated carrier.

Paging systems find wide application in hospitals, factories, office buildings, etc., where it is desired to communicate with individuals who may be moving at random through the building area and to whom information must be sent from a central communication center. In hospitals, in particular, loud speaker types of paging systems are undesirable since they result in a high noise level which is disturbing to the patients. Also, if a large number of persons are subject to call, the system will be operated almost continuously causing a sustained noise problem. Wiring and installation cost of wiring multiple speakers also is very high for systems of this type. For this reason, private receivers for the various individuals who might be called is desirable. While a number of radio-operated paging system receivers have been proposed heretofore, it is generally necessary to provide these receivers with a local source of power such as batteries which must be replaced or periodically serviced.

Receivers of this type are also useful in connection with telephone answering services. In such systems whenever a person is away from his telephone, the operator at a central station may notify a particular person that a call awaits them by means of a paging receiver carried with the person. In the telephone answering system made practical by the present invention, each person is assigned a particular calling frequency and provided with a small personal receiver which is incorporated into the person's eyeglasses or identification badge so that it may be carried conveniently by the person. Whenever a telephone message is received for the particular person, his assigned signal frequency is transmitted and will be received as an audible tone notifying him that he should respond by calling the central office from the nearest available telephone.

It is also desirable in paging systems to provide individually assigned call signals which will be received only by the persons called.

Requirements of a receiver adapted for application to the above and similar fields may also include compactness and lightness which will not interfere with the normal activities of the user. To aid in providing a unit of compactness and lightness, a source of power must be without appreciable weight.

It is, therefore, a further object of this invention to provide an improved paging system employing a receiver which effectively may employ transistors and which may receive and utilize operating power from radio signals or other carrier wave energy.

It is a further object of this invention to provide a compact radio receiver that is independent of any power connection or battery for operation and is of extremely small size. Another object of this invention is to provide a paging receiver which may be made responsive to a single selective frequency and which combines efficient operation with compactness and light weight.

In accordance with the present invention, a radio paging receiver is provided with circuit means for receiving high frequency modulated carrier waves with power derived from the same carrier or other radiation wave energy. The transistor operating potentials are derived from a received carrier as above indicated by means of a solid-state rectifier which converts the received carrier wave to a direct current.

In a further embodiment in accordance with the invention, means are provided for selectively causing the transistor or transistors to operate as part of a regenerative receiver circuit whereby greater signal sensitivity may be had than is available when employing a simple crystal receiver.

The present invention has as one of its objects the provision of a paging receiver and support therefor, and consists of a unitary device which may be placed in or out of use with no more effort or inconvenience than putting on or taking off one's glasses.

Still another object of the invention is to provide a support for a paging receiver, which support is in the form of a frame of a general type of spectacles or eyeglasses and comprising a front frame portion to rest on the bridge of the nose and side bow portions connected to the front frame portion and extending adjacent the side of the head and to the ears.

Yet another object of the invention is to provide a novel paging receiver which is adapted to be worn by the person to be paged and which has a calling frequency assigned to said person and being identifiable therewith by reason of being built in to a personalized object worn by said person such as eyeglasses or identification badge.

Another object of the invention is to provide a novel paging system including a carrier powered receiver and a novel transmitter which enables the calling signal frequencies and the carrier frequencies to be permitted to provide a large number of paging channels with a small number of frequency assignments.

Another object of the invention is to provide a paging receiver which is adapted to be supported by the frame of spectacles or eyeglasses and in particular the side bow portions connected to the front frame portion, said support being readily attached to or removed from the eyeglass frame.

Other objects and advantages of the invention will become readily apparent from a consideration of the following description and drawings wherein:

FIGURE 1 is a perspective view of a pair of eyeglasses housing a novel paging receiver according to the invention.

FIGURE 2 is a schematic diagram of the receiver employed in FIGURE 1.

FIGURE 3 is an exploded view of a paging receiver adapted for modification of ordinary eyeglasses.

FIGURE 4 is a perspective view of a paging receiver adapted for attachment to one bow of a pair of eyeglasses or the like.

FIGURE 5 is a perspective view of a paging receiver attachment for mounting on the bows of eyeglasses.

FIGURE 6 is a perspective view of an identification badge housing a paging receiver.

FIGURE 7 is a perspective view showing the fastening means on the back of the badge shown in FIGURE 6.

FIGURE 8 is a block diagram illustrating the relationships of the power carrier transmitter and the signal carrier transmitter with the paging receiver.

FIGURES 9, 10 and 13 are block diagrams of various paging system transmitters according to the invention.

Figures 4, 5, 6, 7, 8, 9, 10:
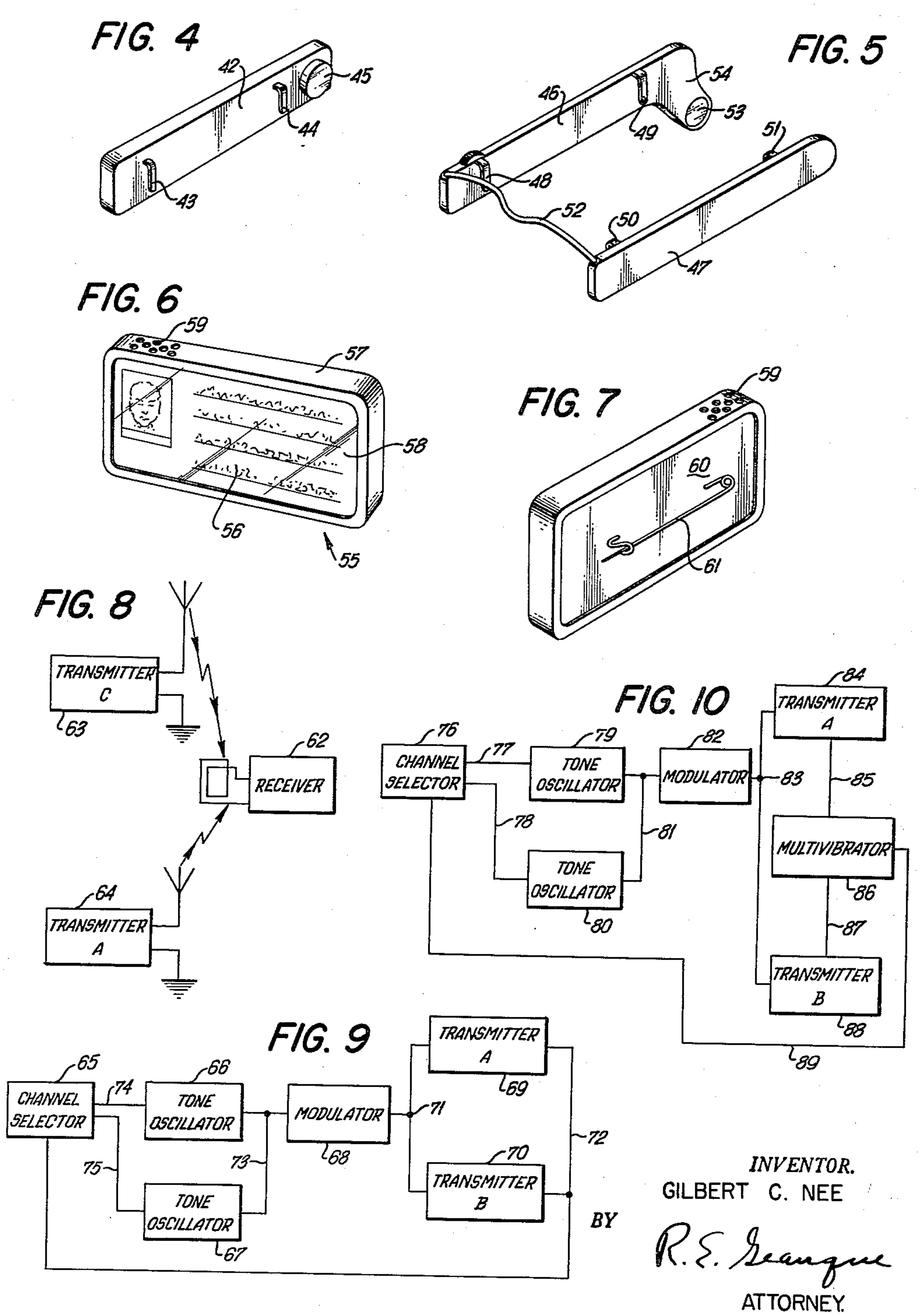

The novel radio paging system of this invention is described in terms of particular embodiments in order to illustrate its features and advantages and not to imply any limitations of use. Carrier powered personal receivers incorporating the present invention obviously have other utility, but are particularly advantageous for applications wherein the requirements are similar to those in the system outlined above.

One embodiment of the paging system comprises three separate elements, namely, a receiver, a first transmitter for supplying power to the receiver via its radiated carrier and a second transmitter for supplying the calling signal via its carrier. The first transmitter may be any existing radio station within close enough range to provide the necessary carrier field strength to operate the receiver, or it may be a local transmitter placed within the paging area for supplying an unmodulated carrier. The second transmitter radiates a carrier modulated with an audio frequency assigned to a particular paging receiver. The receiver employs two separate tuned circuits one of which is resonant with the first transmitter's carrier frequency and the second tuned circuit is resonant with the second transmitter's carrier frequency. The first tuned circuit is employed in the power supply portion of the receiver.

It is desirable that the receiver be identifiable with a particular person since to page a given person the central office transmits a signal on a frequency assigned to the person called. To this end the receiver may be located within the frames of a person's eyeglasses as is shown in FIGURE 1.

Looking now at FIGURE 1 the structure of the power supply portion of the receiver may be conveniently mounted in bow portion while the signal frequency receiver structure may be conveniently mounted in bow portion 2. The frame portion 3 carrying the lenses 5 and 6 is of conventional construction employed in eyeglasses while the bow portions 1 and 2 carry within them the circuit elements of the receiver. Since a comparable number of components are employed in each of these two portions of the receiver, this arrangement will permit maximum optimization of the available space. As can be seen in the schematic diagram of FIGURE 2, only a pair of wires 3 are required to connect these two portions of the receiver. Therefore, it is a simple matter to connect the two portions via the pair of wires 3 since only two conductors are required to connect these two portions of the receiver. Hinges 7 and 8 are adapted to carry the pair of conductors 3 in any convenient and suitable manner. Wires 3 may cross the top of the frame portion 3 in any convenient manner. There being no active or stored energy power supply within the receiver the size and weight of the receiver is substantially less than that employed in hearing aid systems built into eyeglass frames as has been proposed heretofore. Since the received signal comprises only an audible tone the circuit parameters may be peaked or selected to provide optimum efficiency such as is not ordinarily feasible with receivers required to reproduce a relatively wide band of frequencies. For convenience of the wearer, a volume control 4, as shown in FIGURE 3, may be provided to attenuate the audible signal to a desired level.

There is shown in FIGURE 2 a schematic diagram of the receiver portion of the paging system. The power carrier is picked up by coil 10 which may be wound on a ferrite core O in order to provide a high-Q circuit. Variable capacitor 11 is connected in shunt relationship with coil 10 via wires 12 and 13 to provide a tuned circuit resonant with the power carrier frequency. The carrier signal is rectified by diode 14 and is filtered by a conventional capacitor input low-pass filter network comprising capacitor 15, series inductor 16 connected via wires 13 and 17, and shunt capacitor 18. Inductor 17 need not have very high inductance nor need capacitors 15 and 18 have very large capacitance since the frequency of the detected carrier is high thereby making small values sufficient for use in the low pass filter in order to realize an adequately smoothed D.-C. output.

Coil 19 and shunt variable capacitor 20 connected via wires 21 and 22, are tuned to resonate with the signal carrier. Coil 19 may be wound on a ferrite core 23 to provide a high-Q circuit in a very small space. The modulated signal carrier is detected by transistor 24; the signal being applied to the emitter 25. The collector 26 connection to the transistor 24 supplies the detected signal to the output transducer 27 via feedback coil 28 wound in inductive relationship with coil 19. This provides regenerative feedback in order to increase the overall sensitivity of the receiver. The base 29 of the transistor 24 is referenced to the supply voltage source through resistor 30 and bypass capacitor 31. The alternate return to the power source connects the transducer 27 to the smoothing inductor 16. Transducer 27 may be any suitable electroacoustic transducer as are well-known to those skilled in the art for reproducing the detected audio signal. It may be air coupled or employ bone conduction to permit it to be heard by the wearer. It is located in the receiver housing so as to be in close proximity to the ear of the wearer.

The amount of positive feedback via coil 28 may be sufficiently high to cause the receiver to break into sustained oscillation upon reception of the keyed signal carrier since all that is required to be produced at the transducer 27 is an audible tone. Thus, a received RF carrier of an amplitude just sufficient to start oscillation of the regenerative receiver is all that is required. As will be evident to those skilled in the art, a volume control 4 may be employed in the transducer circuit to attenuate the audio signal to any desired level.

There is shown in FIGURE 3 a modification of the device wherein the housing for the receiver is supplied in specially constructed bows 32 and 33 which may be readily attached to existing lens frames 34 hereby obviating complete replacement of an individual's eyeglasses when adapting them to the present invention. In this instance, the bows normally supplied with the wearer's glasses are removed by removing attaching screws 35 and 36 from their mounting holes 37 through 38. The interconnecting pair of wires from bow 32 to bow 33 pass through section 38 across the top edge of frames 34.

In yet another embodiment of the invention, the receiver is enclosed in a housing 42 as shown in FIGURE 4 which is provided with a pair of spring clips 43 and 44 which may be clipped onto one of the bows of the wearer's ordinary eyeglasses. The transducer 45 will lie adjacent the wearer's ear so that he may hear the received tone.

In order to more evenly distribute the weight and size of the receiver, the components may be divided into two separate housings 46 and 47 as shown in FIGURE 5, in contrast with the single larger case 42 of FIGURE 4. These separate cases 46 and 47 may be attached to opposite bows of the wearer's glasses by means of spring clips 48 through 51. The interconnecting pair of wires may be carried in a structure 52 similar to that shown at 39 in FIGURE 3. In order to better orient the transducer 53 with relation to the wearer's ear, a downward extension 54 from case 46 may be employed.

There is shown in FIGURE 6 still another embodiment of the invention in which the paging system receiver is housed in an identification badge 55 which may be worn by individuals who do not wear eyeglasses. It will be obvious that there will be instances in which individuals need not wear glasses. These persons may not wish to wear glasses having lenses without correction for the sole purpose of carrying the paging receiver. In such instances, it is contemplated that the receiver may be attached to the individual's clothing and housed in a holder which also contains the individual's identification badge, such badges commonly being worn in hospitals, factories, and other places where paging systems are required. This arrangement will assure that a particular individual will always have the same receiver thus assuring that the assigned calling channel, as will be described hereinafter, will correspond to a particular person wearing the receiver. In this respect, it is similar to the eyeglasses described above in that in all instances it is necessary that the wearer always have the same receiver corresponding to his assigned channel or signal tone. That is, identification of the individual with the receiver is a part of the invention.

There is shown in FIGURE 6 the outward portion of an identification badge 55 carrying the name and other identification of the individual in visible area 56. A suitable frame 47 surrounds the badge and a transparent covering 58 protects the identification area 56. Openings 59 permit the audible tone from the receiver's transducer to be communicated to the ambient air and thus be heard by the wearer.

There is shown in FIGURE 7 the rear view of the device in FIGURE 6 in which a back cover 60 is provided with a safety clasp 61 or other suitable fastening device for attaching the paging receiver to the wearer.

Looking now at FIGURE 8, there is shown the basic elements of a paging system comprising a paging receiver 62 with its loop antenna, a first transmitter 63 for supplying power to the receiver via its radiated carrier and a second transmitter 64 for supplying a modulated carrier signal to receiver 62. Transmitter C shown at 63 may be any broadcasting station within range of the paging system area which will provide sufficient field strength of its radiated carrier in the paging area to provide operating power for the receiver. In those instances in which a nearby broadcasting station of suitable field strength does not exist, a local transmitter may be placed within the paging area for radiating a power carrier. Transmitter A shown at FIGURE 64 is keyed on each time it is desired to transmit a paging tone to the receiver 62. Transmitter A may operate at any suitable frequency and need not have the same carrier frequency or be in the same frequency band as transmitter C. Only transmitter A need be under the control of the central office for initiating paging signals. Where more than one receiver is to be employed, separate carrier frequencies corresponding to a like number of receivers would be employed by transmitter A for individual signalling of a particular receiver.

In order to optimize the utilization of the portion of the RF spectrum assigned to transmit signals to a plurality of receivers, there is contemplated modifications of the present invention in which carrier frequencies and audio signalling frequencies may be permuted.

In a paging system employing a plurality of receivers, individual receivers may be designed which will be responsive to a particular RF carrier frequency and will further be responsive to only a particular audio signalling frequency. That is, the audio portion of the receiver may include a band-pass filter which will provide a signal to the transducer for only a particular audio frequency. Suitable circuitry to accomplish this will be described hereinafter in connection with FIGURES 14 and 15. For the present, it will be obvious that a receiver having its RF circuit tuned to a given carrier frequency may reproduce a number of audio tones superimposed on the RF carrier. By employing selective band-pass filters in each of a plurality of receivers, selective calling on a given RF frequency may be accomplished by modulating the carrier with audio frequencies corresponding to the pass band of the band-pass filters in the individual receivers. This arrangement for selective radio calling is well known to those skilled in the art.

To transmit a paging signal to a particular receiver, the channel selector 65 of FIGURE 9 is operated to transmit a signal on a particular channel. Operation of the channel selector will activate tone oscillator 66 via line 74 which in turn will modulate transmitter A indicated at number 69, via line 73, modulator 68, and line 71. Two individual receivers are assigned to receive the carrier of transmitter A. However, the audio band-pass filter in one of the receivers will reject the tone generated by tone oscillator 66 and therefore will remain silent. The alternate receiver assigned to receive the carrier of transmitter A will be energized thus producing an audio tone at the second receiver. Assuming that the second receiver was to have been called, the channel selector 65 would be so operated as to energize tone oscillator 67 via line 75. The output of tone oscillator 57 on line 73 will modulate the output of transmitter A via modulator 68 and line 71. In this latter instance, the first receiver will reject the audio tone generated by tone oscillator 67. Two additional receivers may be assigned to the carrier of transmitter B shown at 70; one of these will be assigned the audio tone of oscillator 66 and the alternate will be assigned the tone of oscillator 67. By the arrangement just described, four individual receivers may be selectively called by transmitting on only one or the other of two carrier frequencies, namely, A and B.

There is shown in FIGURE 10 a modification of a transmitting system of FIGURE 9 in which transmitter A is switched on for a given interval while transmitter B is switched off. At the conclusion of the "on" interval of transmitter A, transmitter B is switched on. Thus, at all times, one or the other of the two carriers is being transmitted. The on or off interval may be of any suitable duration and may, for example, be of the order of one second. The channel selector 76 energizes oscillator 79 or oscillator 80 only during the appropriate "on" interval of the selected transmitter. Multivibrator 86 supplies the necessary on-off signal to channel selector 76 via line 89. This arrangement will permit two or more receivers to be called simultaneously and will provide a repeating tone signal at each called receiver, automatically, until the channel selector is switched off at the central station. The operator at the central station activates the channel selector by closing a channel selector switch corresponding to a particular person to be paged. This will energize a corresponding tone oscillator which, for example, may be tone oscillator 79. The output of the tone oscillator is supplied to the modulator 82 via line 81. The modulator impresses the audio tone from oscillator 79 on a carrier transmitted by one of two transmitters. Since assuming that transmitter A shown at 84 is assigned to the person to be paged, this transmitter is energized under the control of multivibrator 86 via line 85. While transmitter A is on, the multivibrator 86 will also activate tone oscillator 79 via line 89 and the switch circuit in the channel selector 76.

Now assuming that a different individual is to be paged, the channel selector may be activated to turn on tone oscillator 79 and the tone will be transmitted via transmitter B at 88. This tone will be generated only when transmitter B is energized by multivibrator 86, since tone oscillator 79 will be switched on by multivibrator 86 via channel selector 76.

Figures 11, 12:
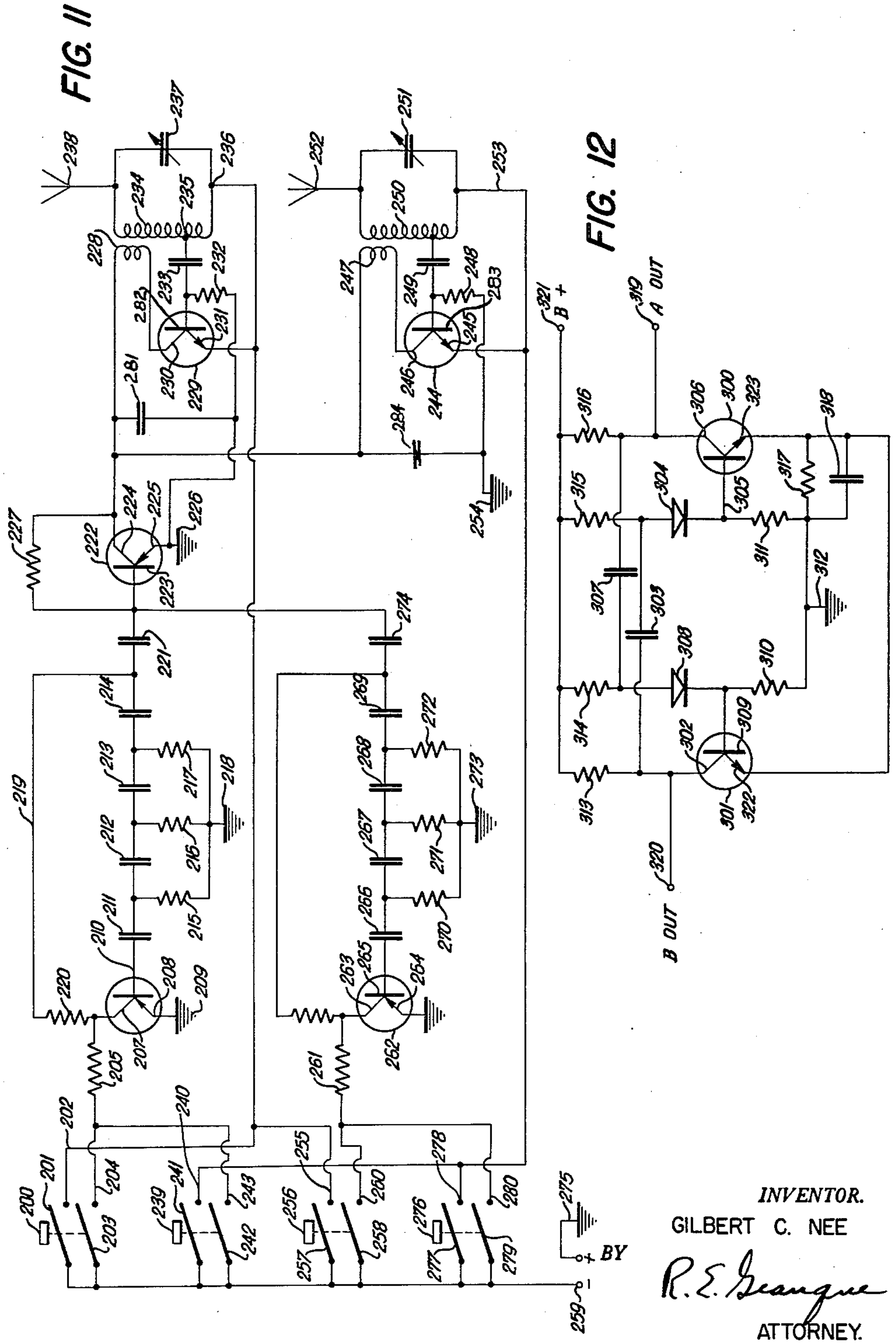
FIGURE 11 is a schematic diagram of the transmitter shown in FIGURE 9.
FIGURE 12 is a schematic diagram of a multivibrator suitable for use in the apparatus of FIGURES 10 and 13.

Looking now at FIGURE 11, there is shown a schematic diagram of the transmitter of FIGURE 9. The channel selector comprises a series of push button switches which may be selectively closed by the operator at the central station. These switches may be momentary "on" push button switches or may be "on-off" toggle switches to permit the paging signal to be continuously transmitted until manually turned off. The tone oscillator comprises a parallel-T phase-shift oscillator for generating a signal frequency in the audio band. A plurality of such oscillators may be employed to meet the channel requirements of the system as will be described hereinafter.

The modulator may comprise a single stage which is driven by the tone oscillator and serves to modulate the RF oscillator of the transmitter. The RF section of the transmitter comprises a modulated RF oscillator. A plurality of RF oscillators, each tuned to an assigned paging frequency, may be employed to meet the channel requirements of the system.

Operation of the transmitting system may be initiated by depressing button 200 thereby closing a circuit from the negative terminal of the power supply 259 via contacts 201 and 203 to contacts 201 and 204. Operating current is supplied to the tone oscillator via contact 204 and resistor 205. Transistor base 210 is coupled to a three-mesh resistance-capacity phase-shifting network comprising capacitors 211–214 and resistors 215–217. The output of this network is connected to the transistor input comprising resistor 220 and collector 207 via line 219 with the circuit so proportioned that the total phase shift between base and collector terminals is 180° at the frequency of oscillation desired. Typically this frequency might be in the range from 420 c.p.s. to 2700 c.p.s. The frequency stability of this circuit with respect to voltage changes is very good. The transistor's emitter 208 is returned to the positive terminal and the power supply 275 via ground 209. The RC network is also referenced to ground via terminal 218. The tone output signal from the oscillator is capacity coupled to the modulator via capacitor 221.

The modulator comprises a single transistor stage having the collector bias established by resistor 227 connected between the base 223 and the collector 224. The emitter 225 is returned to the power supply via ground terminal 226.

The transmitter comprises a modified Hartley oscillator circuit employing a single transistor 229 for generating the RF signal. The tank circuit consists of inductance 234 and shunt capacitance 237. Positive feedback to sustain oscillation is obtained via tapped connection 235 to inductance 234 which is coupled to the transistor base 282 via capacitor 233. Bias for the base 282 is obtained via resistor 232. The collector 230 is inductively coupled to the tank circuit via coil 228 which has impressed upon it the modulating signal from transistor 222. This circuit is bypassed with shunt capacitor 281. The collector 231 and terminal 236 of the tank circuit are returned to the power supply via contact 204 which keys the transmitter on and off. The modulated carrier is radiated from antenna 238.

The transmitter just described may be modulated with a different tone by depressing button 256. This will close the power supply circuit between contacts 257 and 255, and 258 and 260. This will energize the modulator and transmitter described in the preceding paragraph but will not energize the above-described tone oscillator. Rather it will energize the tone oscillator connected between terminal 260 and capacitor 274 and comprising elements 261–273 which correspond generally with elements 205–218 except that their values are proportioned to generate a tone frequency differing from the first described oscillator.

Depressing button 239 or 276 will energize a second RF transmitter comprising elements 224–253 which correspond generally with elements 229–238 of the above-described transmitter except that their values are proportioned to generate a carrier frequency differing from the first described RF oscillator.

A third combination and a fourth combination of tone oscillator and RF oscillator are obtained by depressing buttons 239 and 276 respectively. Button 239 energizes the first described tone oscillator and the last mentioned RF oscillator. Depressing button 276 energizes the last mentioned tone oscillator and the last mentioned RF oscillator via contacts 277–280.

Figure 13:
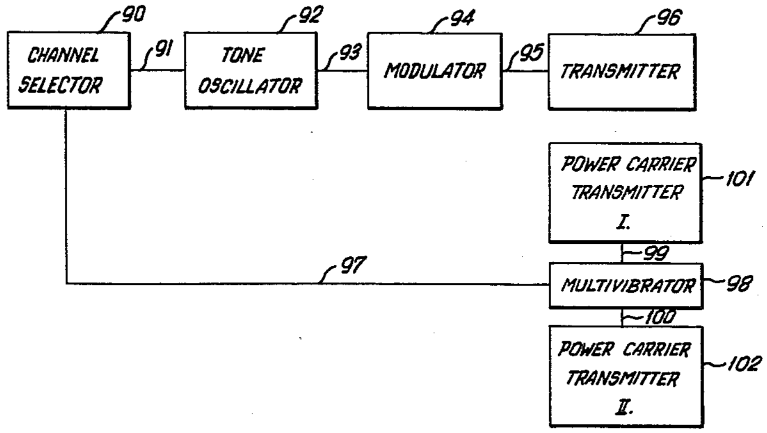

Looking now at FIGURE 13, there is shown a block diagram of a further modification of the transmitting system in which two receivers may be selectively called using a single audio frequency. In this instance, a pair of local transmitters I and II are used to supply operating energy to the receiver. It will be obvious that a receiver having its power carrier circuit tuned to the carrier frequency of transmitter I can energize the audio signal receiver only when power carrier from transmitter I is being radiated. Therefore, a receiver having its carrier power circuit tuned to carrier I is operative to receive a signal carrier only while both power carrier I and the audio signal carrier is being transmitted. To call a particular receiver, an appropriate channel is selected at the central station by depressing a switch at the channel selector 90. This will energize tone oscillator 92 via line 91 and will supply an audio output to modulator 94 via line 93. The modulated output is transmitted by audio signal transmitter 96. Operation of the channel selector 90 will energize power carrier transmitter I shown at number 101 only during the "on" cycles of multivibrator 98. That is, multivibrator 98 will turn on power carrier transmitter 101 via line 99 only for given intervals of time and may, for example, be of the order of one second. The "on" intervals are coordinated with the channel selector 90 via line 97. Tone oscillator 92 will be energized only during the "on" interval of power carrier transmitter 101.

In a like manner, a second receiver could be called by operating a separate channel on the channel selector 90 which will transmit the audio tone only while power transmitter carrier 102 is turned on, it being understood that the two transmitters I and II are local transmitters which do not transmit modulated signals but serve only to power the receivers.

Figure 14:
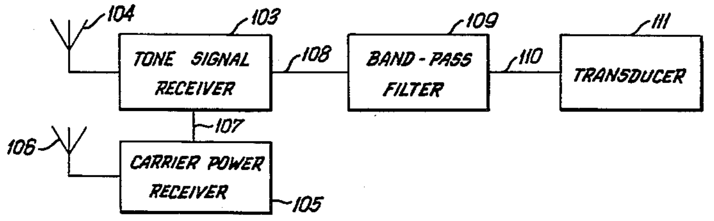
FIGURE 14 is a block diagram showing a modification of the paging system receiver.

Looking now at FIGURE 14, there is shown a block diagram of a paging system receiver adapted to be responsive to only a particular audio frequency or tone. The signal frequency is picked up by antenna 104 which may be a loop antenna wound on a ferrite core and supplies an RF signal to tone signal receiver 103. The detector audio output is supplied on line 108 to band-pass filter 109. When the detected audio signal corresponds to the pass band of filter 109, an energizing signal will be transmited to transducer 111 via line 110. Operating power for tone signal receiver 103 is obtained via antenna 106 and is demodulated and smoothed by carrier power receiver 105 and supplied as a direct current to tone signal receiver 103 via line 107.

Figure 15:
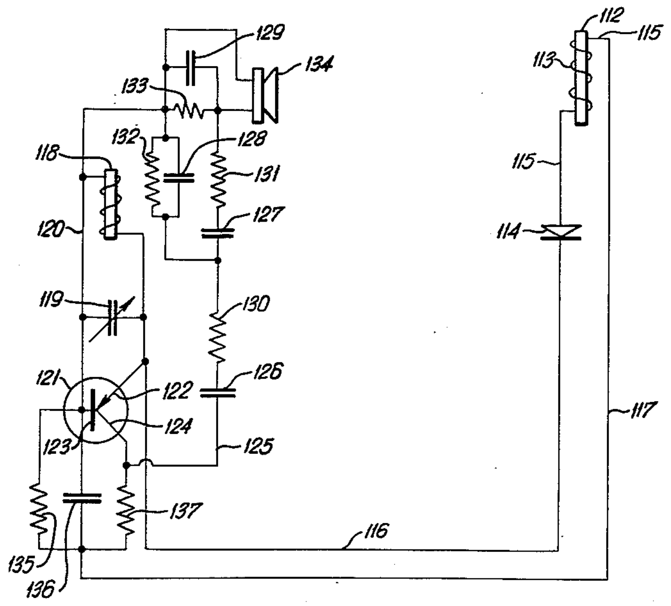
FIGURE 15 is a schematic diagram of the receiver of FIGURE 14.

Looking now at FIGURE 15, there is shown a schematic diagram of the apparatus of FIGURE 14. The power carrier is picked up by coil 113 which may be wound on a ferrite core 112. The energy in antenna coil 113 is conducted to diode 114 on line 115 and provides a demodulated signal to the receiver on lines 116 and 117.

The tone signal carrier is picked up by the resonant circuit comprising inductor 118 and variable capacitor 119 connected in shunt relationship via lines 120 and 116. The output is supplied to transistor 121 which has its emitter 122 and its base 123 connected across the resonant circuit. The collector 124 supplies the audio signal to the input of the band-pass filter on line 125. The band-pass filter comprises cascaded series and shunt RC circuits comprising capacitors 126 through 129 and resistors 130–133. The return path from the detector to transducer 134 is via line 120. The base of transistor 121 is referenced to the power supply circuit via bias resistor 135 and bypass capacitor 136. The emitter 124 is referenced to the power supply via bias resistor 137.

There is shown in FIGURE 12 a schematic diagram of a circuit suitable for use as the multivibrator identified by the number 86 in FIGURE 10 and the number 98 in FIGURE 13. This circuit comprises a free-running multivibrator having a pair of outputs A and B which are alternately at a relatively high potential (on) and a relatively low potential (off). These output potentials may be used as switching levels to block the operation of the transmitters discussed above in order to provide a synchronized on-off switching of the transmitter carriers and tone oscillators.

Looking now at FIGURE 12, the multivibrator comprises a pair of transistors 300 and 301 which are cross-coupled to provide the necessary bi-stable operation. In order to analyze the functioning of this circuit, first assume that transistor 301 has just started to conduct. The collector 302 potential will then begin to drop from the B+ potential obtained from terminal 321, to a potential slightly above ground as determined by the voltage drop across emitter bias resistor 317, due to current flow from ground 312 through resistor 317, transistor 301, and resistor 313 to B+ 321. The voltage swing at the collector 302 is coupled through capacitor 303 to the base 305 of transistor 300 via diode 304 and thus drives the diode 304 to a negative potential. Prior to the voltage swing at the collector, the anode of diode 304 was at a potential slightly above ground because of the conduction of transistor 300. Following the voltage swing, diode 304 will be biased in the reverse direction so that practically no current flows through it. The potential on the base 305 will drop to approximately ground potential when diode 304 is cut off and thus transistor 300 is rendered cut off.

Capacitor 303 now charges through resistor 315 toward the B+ voltage on terminal 321. It can be seen that diode 304 serves to isolate the charging circuit for capacitor 303 from the base circuit of transistor 300. By cutting off the base circuit during the charge time of the capacitor, the frequency stability is improved.

Resistor 311 serves to maintain the base 305 of transistor 300 at ground potential when cut off from capacitor 303 by diode 304. The base of transistor 300 is thus negative with respect to its emitter 323 and the transistor is cut off. Responsive to the cessation of collector current flow in transistor 300, the voltage at collector 306 rises from a potential slightly above ground toward the B+ potential 321. This voltage change is coupled through capacitor 307 and diode 308 to base 309 of transistor 301 to assist in the conduction of transistor 301.

Transistor 300 thus begins to conduct as its collector potential swings from B+ toward the emitter bias potential. This swing is reflected through capacitor 307 and serves to bias diode 308 in the non-conducting direction. Transistor 301 is, of course, cut off from ground potential through resistor 310 when its base circuit 309 is cut off from capacitor 307 by diode 308. The resulting rise of potential at the collector 302 in response to the cessation of collector current flow is reflected through capacitor 303 to base 305 to assist in its build up. Capacitor 307 then charges through resistor 314 until it is charged sufficiently to bias diode 308 into conduction and then continues to charge through resistors 314 and 310 until transistor 301 is rendered conductive.

The two transistors 300 and 301 are alternately operated at a frequency determined by the impedance of capacitor 303 in conjunction with resistor 315 and capacitor 307 in conjunction with resistor 314. As previously mentioned, resistor 317 is utilized to provide emitter bias for both transistors. The current through resistor 317 is substantially constant. By-pass capacitor 318 serves to maintain emitter bias potential during the transfer of operation from one transistor to the other.

As shown, the output from transistor 300 is taken across resistor 316 in the collector 306 circuit of transistor 300; similarly, the output from transistor 301 is taken from the collector circuit 302 to terminal 320. The output signal is, of course, a square wave which swings between the B+ voltage and a voltage equal to approximately the emitter bias potential. The output at terminal 319 will be near the B+ voltage while the output at terminal 320 is near the emitter bias potential, and the two outputs will alternate between these two levels.

The various embodiments of the central station transmitting unit described above have employed transistor circuitry in order to provide a convenient and compact device which may be placed on nurses' desks in a hospital or near a telephone switchboard to facilitate installation. It should be understood, however, that conventional vacuum-tube circuitry may be substituted without departing from the intended scope of the invention. It is, therefore, not intended that the disclosure of any given specific embodiment shall be construed to restrict the invention to that embodiment only; and in general various combinations of the instrumentalities disclosed, departing far from the specific examples illustrated, may be made without, however, departing from the broad principles of the invention as defined in the appended claims.

What is claimed is:

1. In a paging system, a central station for transmitting a fixed frequency paging signal and a selectable frequency power carrier, a plurality of receivers each responsive to the frequency of said paging signal and a particular one of said selectable frequencies of said power carrier, transmitter means at said central station adapted for radiating carrier energy to said receivers for supplying operating power therefor, and means at said central station for selecting the frequency of the power carrier for rendering only a selected one of said plurality of receivers operative.

2. In a paging system, a central station for transmitting paging signals having a fixed modulation frequency and a plurality of selective radio frequency signal carrier frequencies, transmitter means at said central station adapted for radiating carrier energy at a plurality of selectable power carrier frequencies, a plurality of receivers each adapted to respond to only a single combination of a signal carrier and a power carrier, said combination of carriers comprising one of said plurality of signal carrier frequencies and one of said plurality of power carrier frequencies, and switching means at said central station for selecting the frequency of the power carrier and the frequency of the signal carrier to provide a combination of frequencies which will render only a selected one of said plurality of receivers operative.

3. In a paging system as defined in claim 2 wherein said switching means includes a free-running multivibrator which activates selected ones of said plurality of power carrier frequencies in timed relationship with selected ones of said plurality of radio frequency signal carrier frequencies.

4. In a paging system, a central station for transmitting paging signals having a plurality of modulation frequencies and a plurality of signal carrier frequencies, transmitter means at said central station adapted for radiating carrier energy at a plurality of selectable power carrier frequencies, a plurality of receivers each adapted to provide an audible paging signal in response to only a single combination of one of said plurality of modulation frequencies, one of said plurality of signal carrier frequencies and one of said plurality of power carrier frequencies; and selector means at said central station for selecting the combination of modulation frequency, signal carrier frequency, and power carrier frequency in order to render only a selected one of said plurality of receivers operative and thereby produce said audible paging signal.

5. In a paging system, a central station for transmitting paging signals having a plurality of modulation frequencies and a plurality of radio frequency signal carrier frequencies, a plurality of receivers each adapted to respond to only a single combination of one of said signal carrier frequencies and one of said modulation frequencies, a station for simultaneously transmitting carrier energy at a fixed radio frequency to all of said receivers for supplying operating power therefor, and selector means at said central station for selecting one of said radio frequency signal carrier frequencies and one of said modulation frequencies thereby providing a combination of frequencies which will render only a selected one of said plurality of receivers operative.

6. In a paging system, a central sending station including a plurality of power carrier transmitters of different carrier frequencies, each of which corresponds to a particular one of a plurality of paging channels, and a signal carrier transmitter for transmitting a tone signal, a plurality of paging receivers, channel selector means at said central station for selectively transmitting one of said plurality of power carriers together with said tone signal to said receivers, and means at each of said receivers solely responsive to a particular one of said different power carrier frequencies together with said transmitted tone signal to produce an audible paging signal at a particular one of said receivers corresponding to said selected channel.

References Cited in the file of this patent

UNITED STATES PATENTS

| | | |
|---|---|---|
| 2,480,338 | Purington | Aug. 30, 1949 |
| 2,523,315 | Mayle | Sept. 26, 1950 |
| 2,777,057 | Pankove | Jan. 8, 1957 |
| 2,851,592 | Webster | Sept. 9, 1958 |
| 2,899,547 | Crow et al. | Aug. 11, 1959 |
| 2,912,574 | Gensel | Nov. 10, 1959 |
| 2,918,573 | Hollmann | Dec. 22, 1959 |
| 2,997,535 | Brady et al. | Aug. 22, 1961 |

FOREIGN PATENTS

| | | |
|---|---|---|
| 788,099 | Great Britain | Dec. 23, 1957 |

OTHER REFERENCES

Designing Free-Power AM and FM Transistorized Receivers, by Hollmann Electronic Industries and Tele-Tech, September 1956, pp. 54–56 and 92–95.

Mechanix Illustrated, June 1957, page 91.